(12) United States Patent
Kress et al.

(10) Patent No.: US 9,915,823 B1
(45) Date of Patent: Mar. 13, 2018

(54) LIGHTGUIDE OPTICAL COMBINER FOR HEAD WEARABLE DISPLAY

(71) Applicant: Google LLC, Mountain View, CA (US)

(72) Inventors: Bernard C. Kress, Redwood City, CA (US); Ehsan Saeedi, San Francisco, CA (US); Adam E. Norton, Palo Alto, CA (US); Edouard Schmidtlin, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/271,083

(22) Filed: May 6, 2014

(51) Int. Cl.
*G02B 27/01* (2006.01)

(52) U.S. Cl.
CPC .. *G02B 27/0172* (2013.01); *G02B 2027/0174* (2013.01); *G02B 2027/0178* (2013.01)

(58) Field of Classification Search
CPC ............... G02B 2027/0174; G02B 2027/0178
USPC ........................................................ 359/631
See application file for complete search history.

(56) References Cited

U.S. PATENT DOCUMENTS

| | | |
|---|---|---|
| 4,218,111 A | 8/1980 | Withrington et al. |
| 4,220,400 A | 9/1980 | Vizenor |
| 4,560,233 A | 12/1985 | Banbury |
| 4,711,512 A | 12/1987 | Upatnieks |
| 4,799,765 A | 1/1989 | Ferrer |
| 4,968,117 A | 11/1990 | Chern et al. |
| 5,050,966 A | 9/1991 | Berman |
| 5,076,664 A | 12/1991 | Migozzi |
| 5,093,567 A | 3/1992 | Staveley |
| 5,237,455 A | 8/1993 | Bordo et al. |
| 5,257,133 A | 10/1993 | Chen |

(Continued)

FOREIGN PATENT DOCUMENTS

| | | |
|---|---|---|
| EP | 0 898 726 B1 | 3/2000 |
| EP | 0 995 145 B1 | 9/2001 |

(Continued)

OTHER PUBLICATIONS

Cakmakci, O. et al., "Head-Worn Displays: A Review", IEEE, Journal of Display Technology, vol. 2, No. 3, Sep. 2006, pp. 199-216.
Mukawa, H. et al., "8.4: *Distinguished Paper*: A Full Color Eyewear Display using Holographic Planar Waveguides", SID Symposium Digest of Technical Papers, May 2008, vol. 39, Issue 1, pp. 89-92.
Cakmakci, O. et al. "Design of a Freeform Single-Element Head-Worn Display", Proc. of SPIE vol. 7618, 761803, 2010, 6 pages.

(Continued)

*Primary Examiner* — Thomas K Pham
*Assistant Examiner* — Nicholas R Pasko
(74) *Attorney, Agent, or Firm* — Lerner, David, Littenberg, Krumholz & Mentlik, LLP

(57) ABSTRACT

An eyepiece for a head wearable display includes a lightguide component for guiding display light and emitting the display light along at a viewing region. The light guide component includes an input surface oriented to receive the display light into the lightguide component at the peripheral location, a first folding surface disposed to reflect the display light received through the input surface, a second folding surface disposed to reflect the display light received from the first folding surface, an eye-ward facing surface disposed opposite to the second folding surface to reflect the display light received from the second folding surface, and a curved reflective surface having reflective optical power disposed at the viewing region to receive the display light reflected from the eye-ward facing surface and to reflect the display light for emission out through the eye-ward facing surface.

16 Claims, 5 Drawing Sheets

(56) References Cited

U.S. PATENT DOCUMENTS

| | | |
|---|---|---|
| 5,453,877 A * | 9/1995 | Gerbe ............... G02B 17/008 359/630 |
| 5,537,253 A | 7/1996 | Cox et al. |
| 5,539,422 A | 7/1996 | Heacock et al. |
| 5,654,827 A | 8/1997 | Reichert |
| 5,694,230 A | 12/1997 | Welch |
| 5,696,521 A | 12/1997 | Robinson et al. |
| 5,715,337 A | 2/1998 | Spitzer et al. |
| 5,771,124 A | 6/1998 | Kintz et al. |
| 5,815,126 A | 9/1998 | Fan et al. |
| 5,821,911 A | 10/1998 | Jachimowicz |
| 5,844,530 A | 12/1998 | Tosaki |
| 5,880,888 A * | 3/1999 | Schoenmakers ..... G02B 17/008 359/629 |
| 5,886,822 A | 3/1999 | Spitzer |
| 5,896,232 A | 4/1999 | Budd et al. |
| 5,909,325 A * | 6/1999 | Kuba ............ G02B 27/0172 359/633 |
| 5,923,476 A | 7/1999 | Heffner |
| 5,943,171 A | 8/1999 | Budd et al. |
| 5,949,583 A | 9/1999 | Rallison et al. |
| 5,995,071 A | 11/1999 | Mertz |
| 6,005,714 A | 12/1999 | Welch |
| 6,023,372 A | 2/2000 | Spitzer et al. |
| 6,057,966 A | 5/2000 | Carroll et al. |
| 6,091,546 A | 7/2000 | Spitzer |
| 6,094,241 A | 7/2000 | Yamazaki |
| 6,111,701 A | 8/2000 | Brown |
| 6,147,807 A | 11/2000 | Droessler et al. |
| 6,172,657 B1 | 1/2001 | Kamakura et al. |
| 6,201,629 B1 | 3/2001 | McClelland et al. |
| 6,204,974 B1 | 3/2001 | Spitzer |
| 6,204,975 B1 | 3/2001 | Watters et al. |
| 6,222,677 B1 * | 4/2001 | Budd ............... G02B 27/0172 359/630 |
| 6,236,509 B1 | 5/2001 | Grandjean et al. |
| 6,236,511 B1 | 5/2001 | Brown |
| 6,330,118 B1 | 12/2001 | Daschner et al. |
| 6,349,001 B1 | 2/2002 | Spitzer |
| 6,349,004 B1 | 2/2002 | Fischer et al. |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 | 5/2002 | Spitzer |
| 6,396,639 B1 | 5/2002 | Togino et al. |
| 6,462,882 B2 | 10/2002 | Chen et al. |
| 6,466,471 B1 | 10/2002 | Bhattacharyya |
| 6,538,799 B2 | 3/2003 | McClelland et al. |
| 6,618,099 B1 | 9/2003 | Spitzer |
| 6,690,516 B2 * | 2/2004 | Aritake ............... G02B 27/0172 359/630 |
| 6,701,038 B2 | 3/2004 | Rensing et al. |
| 6,724,354 B1 | 4/2004 | Spitzer et al. |
| 6,738,535 B2 | 5/2004 | Kanevsky et al. |
| 6,747,611 B1 | 6/2004 | Budd et al. |
| 6,760,169 B2 | 7/2004 | Takahashi et al. |
| 6,785,060 B2 * | 8/2004 | Kimura ............ G02B 17/0663 348/E5.025 |
| 6,829,095 B2 | 12/2004 | Amitai |
| 6,842,280 B2 * | 1/2005 | Araki ............... G02B 17/0848 359/362 |
| 6,847,488 B2 | 1/2005 | Travis |
| 6,879,443 B2 | 4/2005 | Spitzer et al. |
| 6,880,931 B2 * | 4/2005 | Moliton ............ G02B 27/0101 351/159.01 |
| 6,890,081 B2 * | 5/2005 | Sunaga ............ G02B 17/0848 264/1.1 |
| 6,903,876 B2 * | 6/2005 | Okada ............ G02B 27/0172 359/630 |
| 6,919,976 B2 * | 7/2005 | Kasai ............ G02B 27/0081 345/7 |
| 6,961,162 B2 | 11/2005 | Nakamura et al. |
| 7,021,777 B2 | 4/2006 | Amitai |
| 7,057,814 B2 | 6/2006 | Boyd et al. |
| 7,081,999 B2 * | 7/2006 | Yamazaki ......... G02B 27/0172 359/630 |
| 7,095,562 B1 | 8/2006 | Peng et al. |
| 7,119,965 B1 | 10/2006 | Rolland et al. |
| 7,145,726 B2 | 12/2006 | Geist |
| 7,158,096 B1 | 1/2007 | Spitzer |
| 7,205,960 B2 | 4/2007 | David |
| 7,210,803 B2 | 5/2007 | Matsunaga et al. |
| 7,230,766 B2 | 6/2007 | Rogers |
| 7,242,527 B2 | 7/2007 | Spitzer et al. |
| 7,391,573 B2 | 6/2008 | Amitai |
| 7,411,637 B2 | 8/2008 | Weiss |
| 7,450,310 B2 | 11/2008 | McGuire |
| 7,457,040 B2 | 11/2008 | Amitai |
| 7,477,453 B2 * | 1/2009 | Repetto ............. G02B 17/0856 359/630 |
| 7,542,209 B2 | 6/2009 | McGuire, Jr. et al. |
| 7,566,863 B2 | 7/2009 | Chang et al. |
| 7,576,916 B2 | 8/2009 | Amitai |
| 7,577,326 B2 | 8/2009 | Amitai |
| 7,586,686 B1 | 9/2009 | Hall |
| 7,595,480 B2 | 9/2009 | Kress |
| 7,595,933 B2 | 9/2009 | Tang |
| 7,637,617 B2 | 12/2009 | Liu et al. |
| 7,643,214 B2 | 1/2010 | Amitai |
| 7,663,805 B2 | 2/2010 | Zaloum et al. |
| 7,672,055 B2 | 3/2010 | Amitai |
| 7,699,473 B2 * | 4/2010 | Mukawa ............. G02B 17/086 353/33 |
| 7,715,103 B2 | 5/2010 | Sprague et al. |
| 7,724,441 B2 | 5/2010 | Amitai |
| 7,724,442 B2 | 5/2010 | Amitai |
| 7,724,443 B2 | 5/2010 | Amitai |
| 7,751,122 B2 | 7/2010 | Amitai |
| 7,821,715 B2 | 10/2010 | Suzuki et al. |
| 7,843,403 B2 | 11/2010 | Spitzer |
| 7,884,985 B2 | 2/2011 | Amitai et al. |
| 7,900,068 B2 | 3/2011 | Weststrate et al. |
| 8,000,020 B2 | 8/2011 | Amitai |
| 8,004,765 B2 | 8/2011 | Amitai |
| 8,098,439 B2 | 1/2012 | Amitai et al. |
| 8,125,716 B2 | 2/2012 | Bryant et al. |
| 8,174,569 B2 | 5/2012 | Tanijiri et al. |
| 8,189,263 B1 * | 5/2012 | Wang ............... G02B 27/0172 359/630 |
| 8,212,859 B2 | 7/2012 | Tang et al. |
| 8,294,994 B1 | 10/2012 | Kelly |
| 8,310,764 B2 | 11/2012 | Tanijiri |
| 8,336,333 B2 | 12/2012 | Ushigome |
| 8,384,999 B1 | 2/2013 | Crosby et al. |
| 8,405,573 B2 | 3/2013 | Lapidot et al. |
| 8,411,365 B2 | 4/2013 | Saito |
| 8,432,614 B2 | 4/2013 | Amitai |
| 8,446,340 B2 | 5/2013 | Aharoni |
| 8,471,967 B2 | 6/2013 | Miao et al. |
| 8,488,246 B2 | 7/2013 | Border et al. |
| 8,520,310 B2 | 8/2013 | Shimizu |
| 8,638,483 B2 | 1/2014 | Yamada et al. |
| 8,643,948 B2 | 2/2014 | Amitai et al. |
| 2002/0186179 A1 | 12/2002 | Knowles |
| 2003/0090439 A1 | 5/2003 | Spitzer et al. |
| 2003/0107816 A1 | 6/2003 | Takagi et al. |
| 2004/0190150 A1 | 9/2004 | Nagaoka |
| 2005/0174651 A1 | 8/2005 | Spitzer et al. |
| 2006/0192306 A1 | 8/2006 | Giller et al. |
| 2006/0192307 A1 | 8/2006 | Giller et al. |
| 2006/0215244 A1 | 9/2006 | Yosha et al. |
| 2007/0070859 A1 | 3/2007 | Hirayama |
| 2008/0219025 A1 | 9/2008 | Spitzer et al. |
| 2009/0067057 A1 | 3/2009 | Sprague et al. |
| 2009/0122414 A1 | 5/2009 | Amitai |
| 2010/0046070 A1 | 2/2010 | Mukawa |
| 2010/0046075 A1 | 2/2010 | Powell et al. |
| 2010/0079356 A1 | 4/2010 | Hoellwarth |
| 2010/0103078 A1 | 4/2010 | Mukawa et al. |
| 2010/0149073 A1 | 6/2010 | Chaum et al. |
| 2010/0278480 A1 | 11/2010 | Vasylyev et al. |
| 2011/0175799 A1 * | 7/2011 | Yamada ............ G02B 27/0172 345/8 |

(56) References Cited

U.S. PATENT DOCUMENTS

| | | | |
|---|---|---|---|
| 2011/0193814 A1 | 8/2011 | Gay et al. | |
| 2011/0213664 A1 | 9/2011 | Osterhout et al. | |
| 2011/0221656 A1 | 9/2011 | Haddick et al. | |
| 2012/0212398 A1 | 8/2012 | Border et al. | |
| 2012/0212399 A1 | 8/2012 | Border et al. | |
| 2012/0249797 A1 | 10/2012 | Haddick et al. | |
| 2012/0293548 A1 | 11/2012 | Perez et al. | |
| 2012/0300311 A1 | 11/2012 | Simmonds et al. | |
| 2013/0033756 A1 | 2/2013 | Spitzer et al. | |
| 2013/0070338 A1 | 3/2013 | Gupta et al. | |
| 2013/0113973 A1 | 5/2013 | Miao | |
| 2013/0207887 A1 | 8/2013 | Raffle et al. | |
| 2013/0222896 A1* | 8/2013 | Komatsu | G02B 17/0848 359/365 |
| 2013/0229712 A1 | 9/2013 | Kress | |
| 2013/0235191 A1 | 9/2013 | Miao et al. | |
| 2013/0242405 A1 | 9/2013 | Gupta | |
| 2014/0036361 A1 | 2/2014 | Woodgate et al. | |
| 2014/0071539 A1 | 3/2014 | Gao | |
| 2015/0177519 A1 | 6/2015 | Cakmakci et al. | |
| 2015/0260992 A1 | 9/2015 | Luttmann et al. | |

FOREIGN PATENT DOCUMENTS

| | | |
|---|---|---|
| EP | 1 930 762 A1 | 6/2008 |
| EP | 1 465 003 B1 | 12/2008 |
| GB | 2 272 980 A | 6/1994 |
| JP | 2001-066543 A | 3/2001 |
| WO | WO 96/05533 A1 | 2/1996 |
| WO | WO 2007/065995 A1 | 6/2007 |
| WO | WO 2009/153446 A2 | 12/2009 |
| WO | WO 2010/097439 A1 | 9/2010 |
| WO | WO 2013/112705 A1 | 8/2013 |

OTHER PUBLICATIONS

Kress, B. et al., "Low Cost Replicable Plastic HUD combiner element", Photonics in the Transportation Industry: Auto to Aerospace II, Proc. SPIE vol. 7314, 73140I, Apr. 2009, 8 pages.

Kress, B. et al., "Digital combiner achieves low cost and high reliability for head-up display applications", SPIE Newsroom. DOI: 10.1117/2.1200904.1599, May 2009, 3 pages.

Kress, B. et al., "Applied Digital Optics: From Micro-optics to Nanophotonics, Chapter 5: Digital . Diffractive Optics: Analytic Type", 40 pages, 2009, John Wiley & Sons, Ltd.

Kress, B. et al., "Applied Digital Optics: From Micro-optics to Nanophotonics, Chapter 12: Digital Optics Fabrication Techniques", 74 pages, 2009, John Wiley & Sons, Ltd.

Kress, B. et al., "Applied Digital Optics: From Micro-optics to Nanophotonics, Chapter 14: Replication Techniques for Digital Optics", 27 pages, 2009, John Wiley & Sons, Ltd.

Kress, B. et al., "Applied Digital Optics: From Micro-optics to Nanophotonics, Chapter 16: Digital Optics Application Pools", 60 pages, 2009, John Wiley & Sons, Ltd.

Levola, T., "Diffractive Optics for Virtual Reality Displays," Academic Dissertation, Joensuu 2005, University of Joensuu, Department of Physics, Vaisala Laboratory, 26 pages.

Kent Optronics, Liquid Crystal for Photonics, "Switchable Mirror/Switchable Glass", retrieved from Internet Dec. 16, 2013, 1 page, http://www.kentoptronics.com/switchable.html.

Kent Optronics, Inc., Liquid Crystals for Photonics, "Liquid Crystal Switchable Mirror", 2 pages, http://www.kentoptronics.com, prior to Mar. 12, 2014.

Cakmakci, O. et al., "Eyepiece for Head Wearable Display Using Partial and Total Internal Reflections", U.S. Appl. No. 14/139,277, filed Dec. 23, 2013, whole document.

* cited by examiner

LIGHTGUIDE OPTICAL COMBINER FOR HEAD WEARABLE DISPLAY

TECHNICAL FIELD

This disclosure relates generally to the field of optics, and in particular but not exclusively, relates to eyepieces for head wearable displays.

BACKGROUND INFORMATION

A head mounted display ("HMD") or head wearable display is a display device worn on or about the head. HMDs usually incorporate some sort of near-to-eye optical system to create a magnified virtual image placed a few meters in front of the user. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD typically includes some form of see-through eyepiece and can serve as the hardware platform for realizing augmented reality. With augmented reality the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, field of view, eye box, and efficiency of conventional optical systems used to implemented existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of a system and apparatus that integrates a total internal reflection ("TIR") based lightguide and optical combiner into an eyepiece for a head wearable display are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
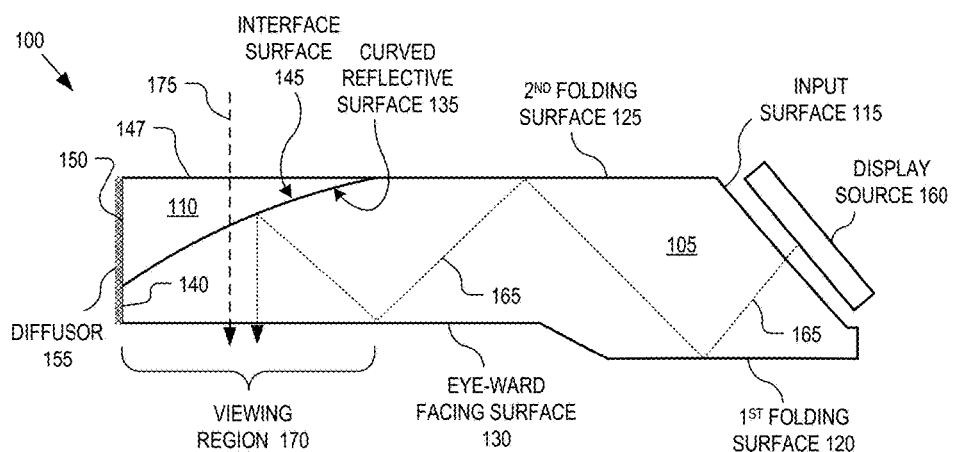
FIGS. 1A and 1B are cross-sectional views of an eyepiece for use with a head wearable display, in accordance with an embodiment of the disclosure.
Figure 1B:
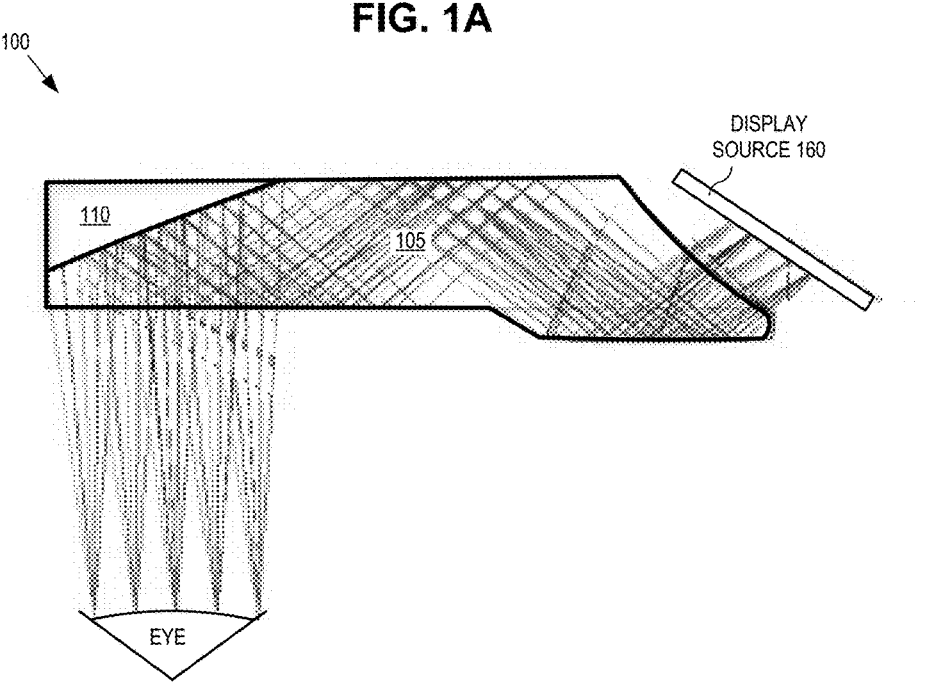

FIGS. 1A and 1B are cross-sectional views of an eyepiece 100 for use with a head wearable display, in accordance with an embodiment of the disclosure. The illustrated embodiment of eyepiece 100 includes a lightguide component 105 and a see-through add-on component 110. The illustrated embodiment of lightguide component 105 includes an input surface 115, a first folding surface 120, a second folding surface 125, an eye-ward facing surface 130, a curved reflective surface 135, and an end surface 140. See-through add-on component 110 includes an interface surface 145, an external scene facing surface 147, and an end surface 150. In the illustrated embodiment a diffusor 155 is coated over end surfaces 140 and 150.

Display source 160 is aligned to inject display light 165 into lightguide component 105 through input surface 115. Display source 160 is located at a peripheral location (proximal end), which is offset from a viewing region 170 near the distal end of eyepiece 100. Display light 165 is emitted from lightguide component 105 in viewing region 170 along an eye-ward direction for viewing by a user. As such, lightguide component 105 operates as a lightguide that transports display light 165 from a peripheral location outside of the user's center of vision to viewing region 170 located nearer to the user's central or foveal vision.

Eyepiece 100 can be implemented in a see-through or non-see-through version, and as such see-through add-on component 110 is an optional component. In see-through embodiments, curved reflective surface 135 is layered with a partially reflective element (e.g., beam splitter coating, polarizing beam splitter coating, diffractive reflector, etc.). The partial reflectivity of curved reflective surface 135 permits ambient scene light 175 to pass through viewing region 170 and combine with display light 165 emitted out through viewing region 170. When indexed matched to lightguide component 105, see-through add-on component 110 defeats the optical power associated with curved reflective surfaced 135 for the ambient scene light 175 passing through. Accordingly, interface surface 145 of see-through add-on component 110 has a size and curvature that mates to and complements the curvature of curved reflective surface 135 of lightguide component 105. Correspondingly, external scene facing surface 147 is complementary to eye-ward facing surface 130 in viewing region 170 to ensure ambient scene light 175 experiences substantially no optical power.

In non-see-through embodiments, curved reflective surface 135 may implemented as a mirror surface with or without add-on component 110 according to industrial design choice.

In one embodiment, lightguide component 105 and add-on component 110 are fabricated as two independent pieces that are bonded together along interface surface 145 and curved reflective surface 135 using a clear adhesive. Lightguide component 105 and add-on component 110 may be fabricated of two different materials having the same index of refraction, or both of the same material. For example, lightguide component 105 and add-on component 110 may be fabricated of optical grade plastic (e.g., Zeonex E-48R), glass, or otherwise. In one embodiment, the components are injection molded to shape, processed to add various optical coatings/layers discussed below, and then bonded together along interface surface 145 and curved reflective surface 135. In one embodiment, lightguide component 105 and add-on component 110 are fabricated of a material having a higher index of refraction than air to induce total interface reflection ("TIR") at first folding surface 120, second folding surface 125, and eye-ward facing surface 130.

In an embodiment wherein curved reflective surface 135 is coated with a partially reflective material, the splitting ratio may be selected according to design needs, but in one embodiment may be implemented as a 50/50 beam splitter. In embodiments where curved reflective surface 135 is implemented using a polarizing beam splitter ("PBS"), display source 160 would output polarized light with a polarization selected to substantially reflect off of the PBS material. A PBS design can serve to increase the efficiency of the optical system. For example, LCD or liquid crystal on silicon ("LCoS") are example display technologies that output polarized light. Of course, external polarizing films may be used in connection with other non-polarized display technologies. When operating with polarized light, it can be beneficial to use low stress materials to reduce the influence of birefringence on the optical design. Accordingly, in some embodiments, lightguide component 105 may be fabricated of low stress plastics, glass, or other low stress optical grade materials.

In see-through embodiments, lightguide component 105 and add-on component 110 are fabricated of optically transmissive materials (e.g., clear plastic) that permit at least a portion of external scene light 175 to pass through viewing region 170 to the user's eye. As such, eyepiece 100 operates as an optical combiner combining external scene light 175 with display light 165 emitted out through eye-ward facing surface 130 in viewing region 170 along an eye-ward direction into the eye. In this way, eyepiece 100 is capable of displaying an augmented reality to the user.

During operation, display source 160 emits display light 165 from a peripheral location offset from viewing region 170 into lightguide component 105. Display source 120 may be implemented using a variety of different display technologies including LCD displays, LCoS displays, organic light emitting diode ("OLED") displays, or otherwise. Display light 165 may include computer generated images.

Display light 165 is incident into lightguide component 105 through input surface 115. Input surface 115 is a curved surface with optical power. In one embodiment, input surface 115 is a cylindrical lensing surface that in connection with the other lensing surfaces can be adjusted to correct aberrations and distortions in the optical system. In the illustrated embodiment, input surface 115 is a cylindrical convex surface (as viewed from display source 160) having its center axis of symmetry in the plane of the page running parallel to the line drawn as input surface 115.

After display light 165 enters into lightguide component 105 through input surface 115, it is incident upon first folding surface 120, which is disposed proximate to input surface 115. First folding surface 120 operates to reflect display light 165 towards second folding surface 125. In the illustrated embodiment, first folding surface 120 is also a curved surface with reflective optical power. For example, first folding surface 120 may be implemented as a cylindrical surface with optical power to aid in correction of aberrations and distortions in the optical system. In the illustrated embodiment, first folding surface 120 is a cylindrical concave surface (as viewed external to lightguide component 105) having its center axis of symmetry in the plane of the page running parallel to the line drawn as first folding surface 120.

After folding (e.g., reflecting) and lensing display light 165 at first folding surface 120, display light 165 is directed towards second folding surface 125 where display light 125 is once again redirected back across lightguide component 105 to eye-ward facing surface 130. In the illustrated embodiment, second folding surface 125 is a planar surface without optical power; however, in other embodiments, second folding surface 125 may also have curvature to impart optical power.

Display light 165 incident upon eye-ward facing surface 130 for the first time is reflected to curved reflective surface 135. In one embodiment, eye-ward facing surface 130 is a planar surface without optical power that is opposite, but parallel to second folding surface 125. Eye-ward facing surface 130 and first folding surface 120 are non-coplanar surfaces off-set from each other.

Curved reflective surface 135 is implemented as an off-axis aspheric lens that provides reflective optical power to collimate or nearly collimate display light 165 emitted from eyepiece 100. For example, display light 165 may be virtually displaced to appear to 2 m to 3 m in front of the user. Of course other amounts of collimation may be implemented. After reflection off of curved reflective surface 135, display light 165 is directed back to eye-ward facing surface 130 in viewing region 170 where display light 165 is emitted out of eyepiece 100 along an eye-ward direction. The second encounter with eye-ward facing surface 130 does not result in TIR, since the angle of incidence is steeper than the required critical angle for TIR.

Eyepiece 100 provides a relatively large eye box (e.g., 8.5 mm horizontal and 6.2 mm vertical) due to its inherent design. This large eye box is due in part to the close proximity of curved reflective surface 135 to the user's eye. Additionally, the relatively shallow oblique angle of curved reflective surface 135 projects a large horizontal eye box area onto eye-ward facing surface 130 in viewing region 170, which also contributes to the eye box size. A large eye box accommodates larger inter-pupillary deviations, thereby providing a larger cross-section of the population with an improved user experience.

In one embodiment, first folding surface 120, second folding surface 125, and eye-ward facing surface 130 are clear surfaces that reflect display light 165 via TIR and careful design control over the incident angles of the light path followed by display light 165. By using TIR for the reflections off of the folding surfaces, eyepiece 100 achieves desirable industrial design characteristics, since eyepiece 100 will appear as a clear eyepiece to external observers. Furthermore, TIR reflections are highly efficient. In an example where curved reflective surface 135 is a 50/50 beam splitter, embodiments of eyepiece 100 can approach near 50% efficiency. In other embodiments, first folding surface 120 and second folding surface 125 may be coated with reflecting films to reflect display light 165 without need of TIR. FIG. 1B illustrates example optical paths through eyepiece 100 by a number of ray trace bundles of display light 165 output from display source 160.

In the illustrated embodiment, diffusor 155 is coated over the distal ends 140 and 150 of lightguide component 105 and add-on component 110, respectively. Diffusor 155 operates to absorb incident light to reduce deleterious back reflections. Diffusor 155 may be implemented as a dark diffusive paint (e.g., matte black paint), and in some embodiments, further includes an anti-reflective coating under the dark diffusive paint. In one embodiment, diffusor 155 includes an opening to permit a portion of display light 165 to bleed out the distal end of eyepiece 200 as a sort of indicator light. The indicator light provides third persons a visual cue that display source 160 is turned on. In one embodiment, the opening may be an image or logo stenciled into the dark diffusive paint and may include a transparent diffusive element under the stenciled image/logo to diffuse the display light emitted as a visual cue.

Figure 2A:
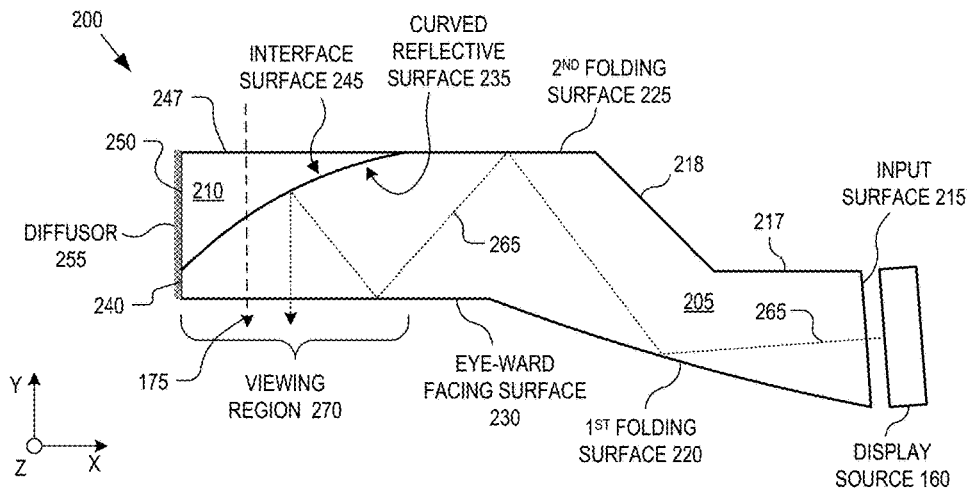
FIGS. 2A and 2B are cross-sectional views of an eyepiece for use with a head wearable display, in accordance with another embodiment of the disclosure.
Figure 2B:
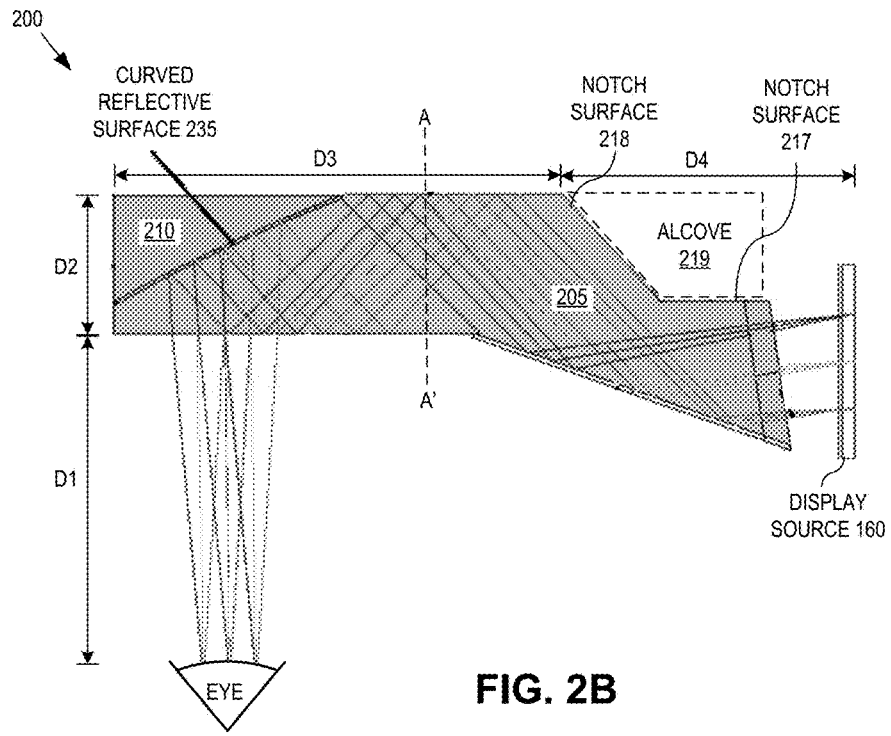

FIGS. 2A and 2B are cross-sectional views of an eyepiece 200 for use with a head wearable display, in accordance with another embodiment of the disclosure. The illustrated embodiment of eyepiece 200 includes a lightguide component 205 and a see-through add-on component 210. The illustrated embodiment of lightguide component 205 includes an input surface 215, notch surfaces 217 and 218, a first folding surface 220, a second folding surface 225, an eye-ward facing surface 230, curved reflective surface 235, and an end surface 240. See-through add-on component 210 includes an interface surface 245, an external scene facing surface 247, and an end surface 250. In the illustrated embodiment a diffusor 255 is coated over end surfaces 240 and 250.

Eyepiece 200 is similar to eyepiece 100 except that notch surfaces 217 and 218 proximal to input surface 215 form an alcove 219 suitably sized to house a camera module or other optical/electrical systems. Furthermore, first folding surface 220 is tilted towards display source 160 and lengthened to extend between (and directly interface with) input surface 215 and eye-ward facing surface 230.

Figure 3A:
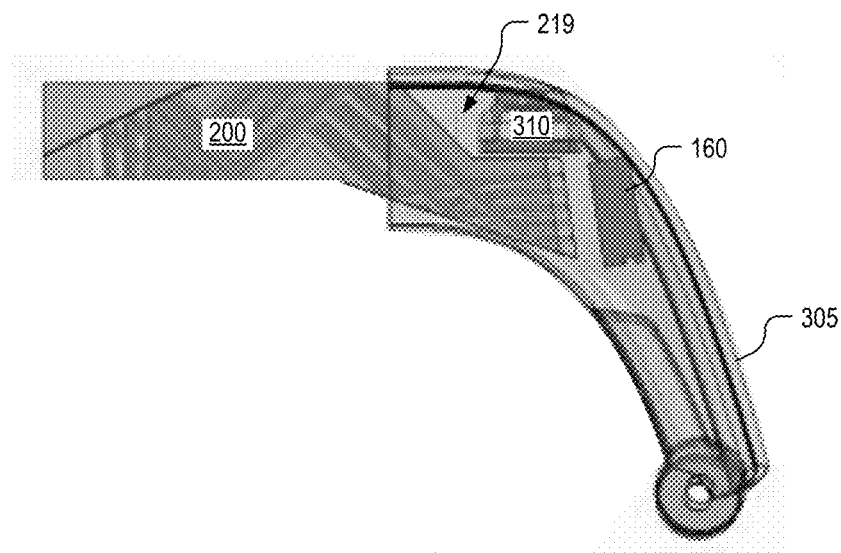
FIG. 3A is a cross-sectional view of an eyepiece including an alcove notched into a lightguide component to accommodate a camera module within a temple housing, in accordance with an embodiment of the disclosure.
Figure 3B:
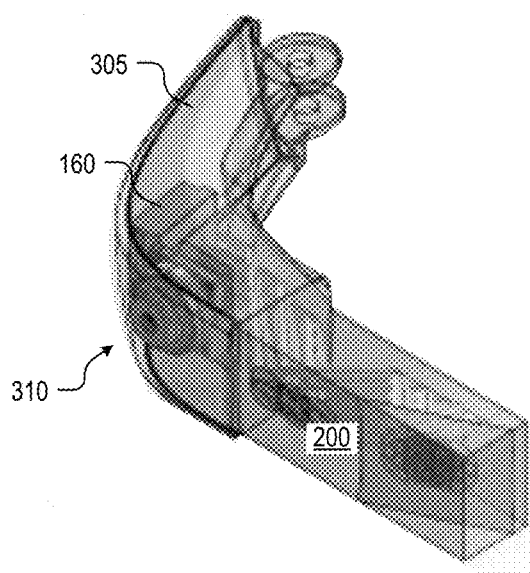
FIG. 3B is a perspective view of an eyepiece including an alcove notched into a lightguide component to accommodate a camera module within a temple housing, in accordance with an embodiment of the disclosure.

FIGS. 3A and 3B illustrate an example housing configuration for eyepiece 200, in accordance with an embodiment of the disclosure. FIG. 3A is a cross-sectional view while FIG. 3B is a perspective view of the same. As illustrated, the proximal end of eyepiece 200 inserts into a housing 305. Housing 305 is shaped for mounting to a temple region of an eyewear-like frame for wearing on a head of user (e.g., see FIGS. 4A and 4B). Frame 305 positions display source 160 peripherally to the user's central vision. Further as illustrated, alcove 219 provides a convenient location for additional circuitry or optical components, such as for example, a forward facing camera module 310.

In one embodiment, eyepiece 200 delivers display light 265 with a 15 degree field of view having a 16:9 aspect ratio (e.g., 13 degree horizontal and 7.35 degrees vertical) and a resolution of approximately 4 arc mins based upon display source 160 having a 640×360 pixel display and 7.5 um pixel size. Additional design specification of such an embodiment include an eye relief (D1) of 18 mm and approximate lightguide component dimensions including: D2=7.2 mm, D3=25 mm, D4=15 mm, and rectangular cross sectional dimensions along line A-A' of 7.2 mm×10 mm. Eyepiece 200 is also capable of providing a relatively large eye box (e.g., 8.5 mm horizontal by 6.2 mm vertical) for similar reasons as discussed above in connection with eyepiece 100. Of course, these dimensions are merely demonstrative and alternative dimensions may be implemented. In one embodiment, curved reflective surface 235 is an off-axis asphere with a sag equation:

$$Z(r) = \frac{r^2}{R} \frac{1}{1 + \sqrt{1 - (1+k)(r/R)^2}} + \beta_3 r^3 + \beta_4 r^4,$$

where $R=-81.62$, $k=-3.63$, $\beta_3=-5.00$ E–05, and $\beta_4=-3.81$ E–08. In one embodiment, input surface 215 is a regular cylinder with a radius of $R=-6.502$ having an orientation that is similar to that described above in connection with input surface 115. In the illustrated embodiment, the local coordinate system of curved reflective surface 235 for the sag equation provided above is offset compared to the center of viewing region 270 by −43.52 mm in X, 2.4 mm in Y, and 11.32 mm in Z. In this embodiment, the local coordinate system of curved reflective surface 235 is further rotated in the Y-Z plane by −3.7 degrees, and in the X-Z plane −8.95 degrees. In one embodiment, first folding surface 220 is an off axis toroid with a sag equation:

$$Z(y) = \frac{y^2}{R} \frac{1}{1 + \sqrt{1 - (1+k)(y/R)^2}} + ay$$

where $R=-7.113$, $a=0.061$, $k=0.00$, and a radius of rotation of 1468. In this embodiment, the center of the radius of rotation is offset −453.77 mm in X, 0 mm in Y and 1401.06 mm in Z relative to the center of the viewing region 270. In other embodiments, first folding surface 220 is a cylinder having an orientation that is similar to that described above in connection with first folding surface 120. In one embodiment, input surface 215 is a cylinder with a convex radius of −7.175 mm and an angle of 70 degrees to eye-ward facing surface 230. Of course, these curvatures, positions, and angles are merely demonstrative and alternative curvatures, positions, and angles may be implemented.

Figure 4A:
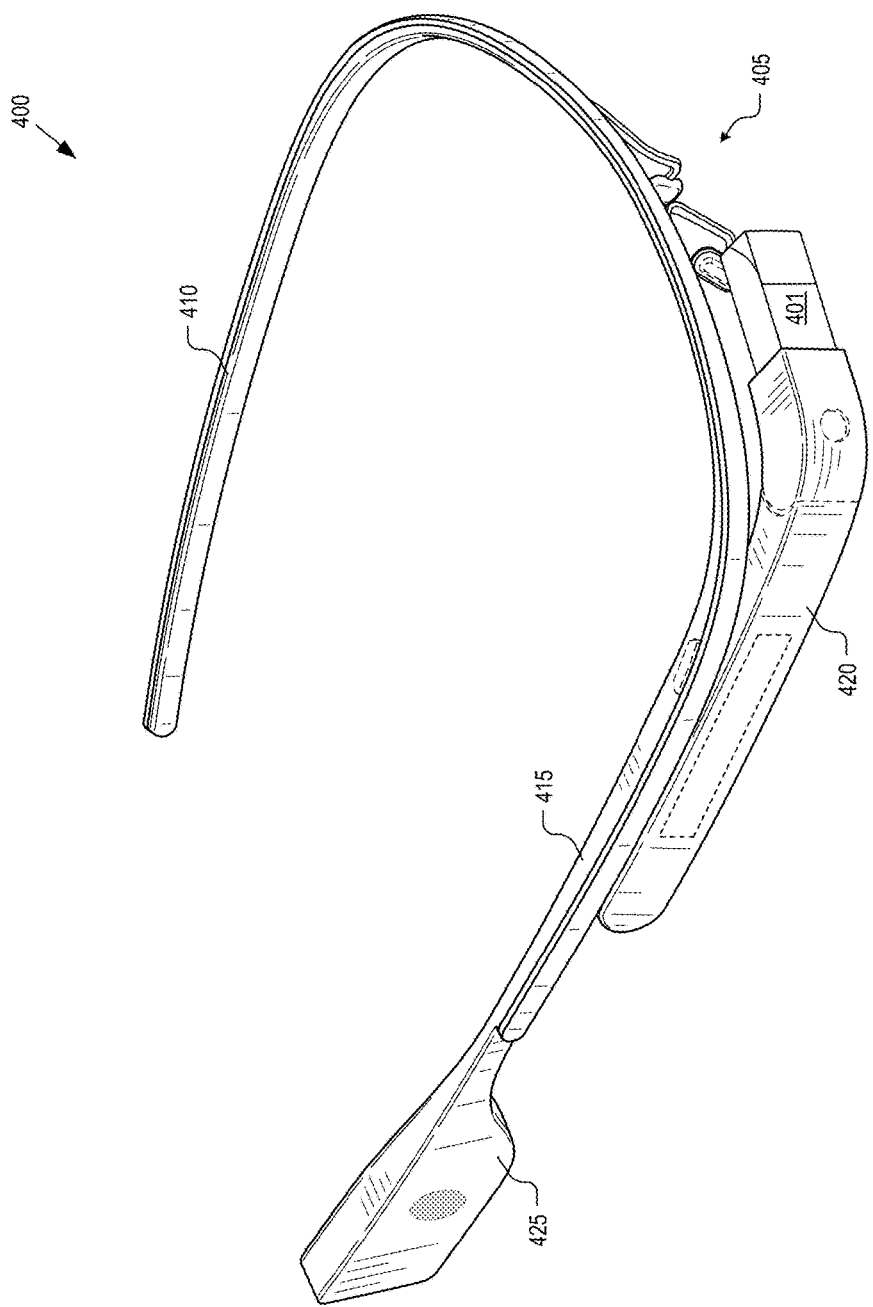
FIGS. 4A and 4B illustrate a demonstrative head wearable display using an eyepiece including a lightguide optical combiner, in accordance with an embodiment of the disclosure.
Figure 4B:
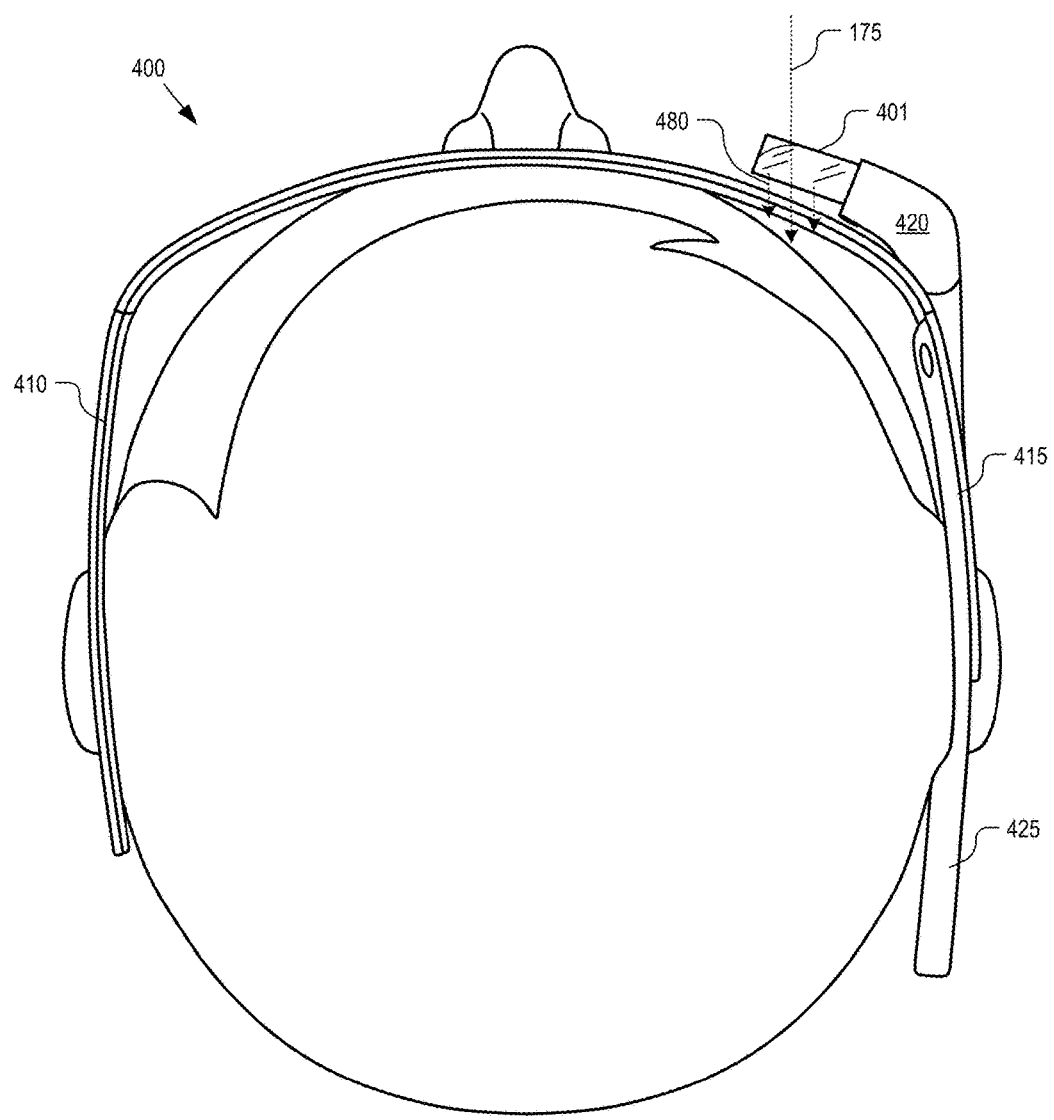

FIGS. 4A and 4B illustrate a monocular head wearable display 400 using a eyepiece 401, in accordance with an embodiment of the disclosure. FIG. 4A is a perspective view of head wearable display 400, while FIG. 4B is a top view of the same. Eyepiece 401 may be implemented with embodiments of eyepieces 100 or 200 as discussed above. Eyepiece 401 is mounted to a frame assembly, which includes a nose bridge 405, left ear arm 410, and right ear arm 415. Housings 420 and 425 may contain various electronics including a microprocessor, interfaces, one or more wireless transceivers, a battery, a camera, a speaker, etc. Although FIGS. 4A and 4B illustrate a monocular embodiment, head wearable display 400 may also be implemented as a binocular display with two eyepieces 401 each aligned with a respective eye of the user when display 400 is worn.

Eyepiece 401 is secured into an eye glass arrangement or head wearable display that can be worn on the head of a user. The left and right ear arms 410 and 415 rest over the user's ears while nose bridge 405 rests over the user's nose. The frame assembly is shaped and sized to position the viewing region in front of an eye of the user. Other frame assemblies having other shapes may be used (e.g., traditional eyeglasses frame, a single contiguous headset member, a headband, goggles type eyewear, etc.).

The illustrated embodiment of head wearable display 400 is capable of displaying an augmented reality to the user. A see-through embodiment permits the user to see a real world image via ambient scene light 175. Left and right (binocular embodiment) display light 480 may be generated by display sources 160 mounted in peripheral corners outside the user's central vision. Display light 480 is seen by the user as a virtual image superimposed over ambient scene light 175 as an augmented reality. In some embodiments, ambient scene light 175 may be fully, partially, or selectively blocked to provide sun shading characteristics and increase the contrast of display light 480.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eyepiece for a head wearable display, the eyepiece comprising:
   a lightguide component for guiding display light received at a peripheral location offset from a viewing region and emitting the display light at the viewing region, the light guide component including:
   an input surface oriented to receive the display light into the lightguide component at the peripheral location;
   a first folding surface disposed to receive the display light from the input surface without reflection and to reflect the received display light;
   a second folding surface disposed to face the first folding surface and to reflect the display light received from the first folding surface without an intervening reflection, wherein the input surface and the second folding surface are non-coplanar;
   an eye-ward facing surface disposed to face the second folding surface and to reflect the display light received from the second folding surface, wherein the eye-ward facing surface is positioned as an emission surface for emitting the display light out of the lightguide component, wherein the first folding surface and the eye-ward facing surface are non-coplanar surfaces of the lightguide component that do not directly interface with each other by making contact, wherein the second folding surface and the eye-ward facing surface are non-coplanar, parallel surfaces that are both flat and both without optical power; and
   a curved reflective surface having reflective optical power disposed at the viewing region to receive the display light reflected from the eye-ward facing surface and to reflect the display light for emission out through the eye-ward facing surface.

2. The eyepiece of claim 1, wherein the first folding surface, the second folding surface, and the eye-ward facing surface are clear surfaces that are oriented relative to each other to reflect the display light via total internal reflection.

3. The eyepiece of claim 1, wherein the input surface is a cylindrical surface that imparts optical power to the display light received into the lightguide component.

4. The eyepiece of claim 1, wherein the first folding surface is a cylindrical surface that imparts optical power to the display light reflected internally to the lightguide component.

5. The eyepiece of claim 1, wherein the curved reflective surface comprises a partially reflective surface that partially reflects the display light and transmits ambient scene light through the viewing region and operates to optically combine the ambient scene light with the display light.

6. The eyepiece of claim 5, further comprising:
   a see-through add-on component mounted to the lightguide component along the curved reflective surface in the viewing region,
   wherein the see-through add-on component is at least partially transparent to ambient scene light travelling along an eye-ward direction and is formed of a material having an index of refraction substantially equivalent to that of the lightguide component.

7. The eyepiece of claim 6, wherein the see-through add-on component includes:
   an interface surface having a size and a curvature that mates to and complements the curved reflective surface of the lightguide component; and
   an external scene facing surface that is complementary to the eye-ward facing surface in the viewing region such that the ambient scene light that passes through the see-through add-on component and the lightguide in the viewing region experiences substantially no optical power.

8. The eyepiece of claim 7, a diffusor coated onto end surfaces of the lightguide component and the see-through add-on component distal to the input surface to reduce back reflections down the lightguide component.

9. A head wearable display for displaying an image to a user, the head wearable display comprising:
   a display source to generate display light;
   a lightguide component for guiding display light received at a peripheral location offset from a viewing region and emitting the display light at the viewing region, the light guide component including:
   an input surface to receive the display light into the lightguide component;
   a first folding surface disposed to reflect the display light received through the input surface;
   a second folding surface disposed to face the first folding surface and to reflect the display light received from the first folding surface without an intervening reflection, wherein the input surface and the second folding surface are non-coplanar;
   an eye-ward facing surface disposed to face the second folding surface and to reflect the display light received from the second folding surface, wherein the eye-ward facing surface is positioned as an emission surface for emitting the display light out of the lightguide component, wherein the first folding surface and the eye-ward facing surface are non-coplanar surfaces of the lightguide component, wherein the second folding surface and the eye-ward facing surface are non-coplanar surfaces;
   a curved reflective surface having reflective optical power disposed at the viewing region to receive the display light reflected from the eye-ward facing surface and to reflect the display light for emission out through the eye-ward facing surface;

a first notch surface that directly interfaces by contact with the input surface; and a second notch surface that directly interfaces by contact with both the second folding surface and the first notch surface, wherein the first and second notch surfaces are non-coplanar with each other and non-coplanar with the input surface, the first folding surface, and the second folding surface;

wherein the first and second notch surfaces form an alcove in the lightguide component adjacent to the input surface;

a camera module disposed in the alcove, wherein a lens of the camera module faces outward from the lightguide component away from the eye-ward facing surface; and a frame assembly to support the lightguide component and the display source for wearing on a head of the user with the viewing region positioned in front of the eye of the user.

10. The head wearable display of claim 9, wherein the first folding surface, the second folding surface, and the eye-ward facing surface are clear surfaces that are oriented relative to each other to reflect the display light via total internal reflection.

11. The head wearable display of claim 9, wherein the input surface and the first folding surface are cylindrical surfaces that impart optical power to the display light received into the lightguide component.

12. The head wearable display of claim 11, wherein the second folding surface and the eye-ward facing surface are planar surfaces with no optical power.

13. The head wearable display of claim 9, wherein the curved reflective surface comprises a partially reflective surface that partially reflects the display light and transmits ambient scene light through the viewing region and operates to optically combine the ambient scene light with the display light.

14. The head wearable display of claim 13, further comprising:

a see-through add-on component mounted to the lightguide component along the curved reflective surface in the viewing region, wherein the see-through add-on component is at least partially transparent to ambient scene light and is formed of a material having an index of refraction substantially equivalent to that of the lightguide component.

15. The head wearable display of claim 14, wherein the see-through add-on component includes:

an interface surface having a size and a curvature that mates to and complements the curved reflective surface of the lightguide component; and an external scene facing surface that is complementary to the eye-ward facing surface in the viewing region such that the ambient scene light that passes through the see-through add-on component and the lightguide in the viewing region experiences substantially no optical power.

16. An eyepiece for a head wearable display, the eyepiece comprising:

a lightguide component for guiding display light received at a peripheral location offset from a viewing region and emitting the display light at the viewing region, the light guide component including:

an input surface oriented to receive the display light into the lightguide component at the peripheral location;

a first folding surface disposed to receive the display light from the input surface without reflection and to reflect the received display light;

a second folding surface disposed to face the first folding surface and to reflect the display light received from the first folding surface without an intervening reflection, wherein the input surface and the second folding surface are non-coplanar;

an eye-ward facing surface disposed to face the second folding surface and to reflect the display light received from the second folding surface, wherein the eye-ward facing surface is positioned as an emission surface for emitting the display light out of the lightguide component, wherein the first folding surface and the eye-ward facing surface are non-coplanar surfaces of the lightguide component, wherein the second folding surface and the eye-ward facing surface are non-coplanar surfaces and wherein the first folding surface is a continuous surface that directly interfaces by contact to both the eye-ward facing surface and the input surface; and a curved reflective surface having reflective optical power disposed at the viewing region to receive the display light reflected from the eye-ward facing surface and to reflect the display light for emission out through the eye-ward facing surface.

* * * * *